(12) United States Patent
Vandenbulcke et al.

(10) Patent No.: US 8,661,668 B2
(45) Date of Patent: Mar. 4, 2014

(54) METHOD AND DEVICE FOR ASSEMBLING A WIND TURBINE AT SEA

(75) Inventors: Luc Vandenbulcke, Kontich (BE); Koen Vanderbeke, Erps-Kwerps (BE)

(73) Assignee: GeoSea N.V., Zwijndrecht (BE)

( * ) Notice: Subject to any disclaimer, the term of this patent is extended or adjusted under 35 U.S.C. 154(b) by 299 days.

(21) Appl. No.: 13/020,918

(22) Filed: Feb. 4, 2011

(65) Prior Publication Data
US 2011/0219614 A1 Sep. 15, 2011

(30) Foreign Application Priority Data

Feb. 8, 2010 (EP) .................................... 10152885

(51) Int. Cl.
*B21K 25/00* (2006.01)
*B23P 15/04* (2006.01)
*B25B 27/14* (2006.01)

(52) U.S. Cl.
USPC .................... 29/889.21; 29/281.4; 29/281.5

(58) Field of Classification Search
USPC ........... 29/240, 889.21, 889.22, 281.4, 281.5, 29/281.6; 416/226; 290/44, 55
See application file for complete search history.

(56) References Cited

U.S. PATENT DOCUMENTS

| | | | |
|---|---|---|---|
| 7,975,354 B2 * | 7/2011 | Greenberg et al. | 29/23.51 |
| 8,046,886 B2 * | 11/2011 | Demania et al. | 29/23.51 |
| 8,164,210 B2 * | 4/2012 | Boone et al. | 290/55 |
| 8,230,802 B2 * | 7/2012 | Siegfriedsen | 114/268 |
| 2009/0159549 A1 | 6/2009 | Trede et al. | |
| 2009/0183349 A1 * | 7/2009 | Walsh et al. | 29/23.51 |
| 2010/0067989 A1 * | 3/2010 | Brown et al. | 405/196 |
| 2012/0027523 A1 * | 2/2012 | Vanderbeke | 405/195.1 |
| 2012/0027525 A1 * | 2/2012 | Vandenbulcke et al. | 405/196 |

FOREIGN PATENT DOCUMENTS

| | | |
|---|---|---|
| EP | 1 677 006 A2 | 7/2006 |
| EP | 2 128 431 A2 | 12/2009 |

OTHER PUBLICATIONS

English Language Abstract for EP 2 128 431 (A2) European Search Report, EP 10 15 2865 dated Sep. 29, 2010.

* cited by examiner

*Primary Examiner* — David Bryant
*Assistant Examiner* — Jun Yoo
(74) *Attorney, Agent, or Firm* — Novak Druce Connolly Bove + Quigg LLP (57) ABSTRACT

The invention relates to a device for assembling a rotor of a wind turbine at sea. The device has a support structure that is provided with a rotating table for rotating the hub of a rotor around the hubs longitudinal axis. The support structure is further adapted to be connected to an offshore platform such that the rotating table may be positioned outside the periphery of the platform. The invention also relates to an assembly of an offshore platform and the device, connected thereto. The invention further relates to a method for assembling a rotor of a wind turbine at sea, and to a method of assembling a wind turbine at sea, using the device and assembly. The device and method provide a more efficient assemblage.

14 Claims, 7 Drawing Sheets

METHOD AND DEVICE FOR ASSEMBLING A WIND TURBINE AT SEA

CROSS-REFERENCE TO RELATED APPLICATION

This application claims priority to European Patent Application No. 10152885.9 filed Feb. 8, 2010, which is hereby incorporated by reference in its entirety.

FIELD OF THE INVENTION

The invention relates to a method of assembling a wind turbine at sea. The invention in particular relates to a device and method for assembling a rotor of a wind turbine at sea. The invention also relates to an assembly of an offshore platform and a device for assembling a rotor of a wind turbine at sea, connected thereto.

BACKGROUND

A growing number of constructions is built at sea. A typical example concerns an offshore wind turbine, which typically comprises a gondola or nacelle, supported on a mast that can be more than 100 meters high. The mast is usually assembled from a number of mast segments that are placed successively on each other. The nacelle acts as housing for the required electrical equipment. The wind turbine is further provided with a rotor, which comprises a hub, onto which a plurality of blades is connected. The hub forms the connection between the rotor blades of the wind turbine and the nacelle. A generator in the nacelle transforms the rotary movement of the hub into electrical energy, and delivers this energy to the electrical grid network on the shore.

The rotor blades are large structures with lengths that may exceed 40 meters and more. The blade geometry is of course adapted to catch wind energy easily and efficiently. This makes assembly at sea, as well as transport of such blades from a shore location to an offshore wind energy park particularly difficult.

A known method for assembling a wind turbine at sea comprises connecting a plurality of blades to a hub on shore, and transporting the thus obtained rotor in assembled state, optionally together with mast segments and using a suitable vessel to an off shore jack-up platform in close proximity to the anticipated wind turbine location. A rotor is assembled on shore since it is considered too difficult to perform this operation at sea on a relatively small platform. Moreover, wind turbine and in particular rotor blade structures are lightly build, preferably from reinforced plastics, and are for this reason extremely fragile and vulnerable to damage. Assembling a rotor at sea would undesirably increase the risk for damage.

A crane provided on the jack-up platform transfers the mast segments and rotor from the transport vessel and manipulates them in order to assemble the wind turbine in close proximity to the platform. A known method takes each mast segment and places it on top of a previously positioned mast segment until the wind turbine mast is completed. After having added the nacelle on top of the mast, the crane present on the platform manipulates the assembled rotor to bring it into position and connect it to the nacelle.

The known method is time-consuming and uses a lot of space on the platform. Moreover, manipulating a rotor with a crane demands good coordination and skill, a lack of which may invoke danger and damage to the rotor.

It is an object of the present invention to provide a method of assembling a wind turbine at sea. It is another object of the present invention to provide a device and method for assembling a rotor of a wind turbine at sea. A further object of the invention is to provide an assembly of an offshore platform and a device for assembling a rotor of a wind turbine at sea, connected thereto.

These and other objects are achieved by a device for assembling a rotor of a wind turbine at sea, the device comprising a support structure that is provided with means for rotating the hub of a rotor around the hubs longitudinal axis, the support structure being adapted to be connected to an offshore platform such that the rotating means may be positioned outside the periphery of the platform. The device according to the invention is particularly suitable for efficiently assembling a rotor of a wind turbine at sea. By among others providing a support structure with means adapted to rotate the hub of a rotor, a rotor can be assembled at sea in a reliable manner whereby the risk for damage to the rotor is reduced. Now that a device is provided that allows to efficiently and reliably assemble a rotor at sea, the rotor does not need to be transported from an onshore location to the offshore location in assembled state, which significantly aids, and improves safety during such transport.

A hub of a rotor generally comprises a circumferential body of revolution with an axis of revolution corresponding to the longitudinal axis of the hub. A number of wind turbine blades is attached to the circumference of the hub to obtain a rotor. The blades extend outwardly and about perpendicular to the longitudinal axis of the hub.

The invention further relates to a method for assembling a rotor of a wind turbine at sea. The method comprises providing an assembly of a device according to the invention and an offshore platform, providing a plurality of blades and a hub that together define a rotor in unassembled state, attaching the hub to the rotating means of the support structure to obtain a first position of the hub, connecting a blade to the hub in said first position, rotating the hub around the hubs longitudinal axis to a second position, and connecting a second blade to the hub in said second position.

In another aspect of the invention, a method is provided wherein the sequence of rotating the hub from a first to a second position and connecting a blade to the hub in said second position is repeated until all blades have been connected to the hub, and the hub is released from the rotating means.

In yet another aspect of the invention, a method is provided wherein the hub is rotated from the first position to the second position around a substantially vertical axis. In this preferred embodiment, the hub is positioned in an upstanding position with its longitudinal axis substantially coinciding with the vertical direction, i.e. the direction perpendicular to the plane of the work deck of the platform. A blade that has been attached to the hub in a first position therefore will rotate in a substantially horizontal plane when rotating the hub to the second position. The first and second positions preferably coincide with rotational positions of the hub in which a blade is easily connected to the hub. Such positions preferably coincide with rotational positions of the hub in which attachment locations for the blades on the hub are readily accessible from the work deck of the platform. Such positions preferably include positions in which a to be assembled blade extends about parallel to an edge of the platform. Such a position allows to manipulate said blade from the platform in a well controlled manner, thereby avoiding damage to the blade.

SUMMARY OF THE INVENTION

A further preferred method according to the invention is characterized in that the hub is rotated such that a blade connected to the hub is rotated away from the platform. This prevents that a connected blade has to traverse part of the work deck of the platform.

A preferred embodiment of the invention provides a device, wherein the rotating means comprise a turntable, provided with gripping means for the hub. Gripping means may be any means that are adapted to grip the hub of a rotor, so that it may be rotated without substantial play. The gripping means may be mechanical, electromechanical and/or magnetic, and may be releasably connected to the support structure, if desired.

A further preferred embodiment of the device according to the invention comprises a support structure and rotating means that are adapted to translate or tilt the hub with respect to the support structure. Such an embodiment allows to translate and/or tilt the hub with respect to the platform for easy access. More preferably, the support structure and rotating means are adapted to translate the hub with respect to the support structure from a position within the periphery of the platform to a position outside the periphery of the platform.

In yet another preferred embodiment, the device according to the invention comprises rotating means that are adjustable in height. This embodiment not only allows to adjust the height of the hub, or the height of blades attached to the hub, relative to the level of the platform work deck, in order to improve accessibility, but also allows to bring the hub (and blades) to a level that is substantially higher than the platform work deck level. A position at such a substantially elevated level can be used for temporary storage and/or for allowing a faster and more expedient assemblage of a wind turbine. Providing the additional ability to tilt at least a part of the support structure around a horizontal axis is instrumental in bringing the rotor from a position in which the blades are substantially horizontal (i.e. substantially parallel to the plane of the work deck) to a position in which the rotor blades are substantially vertical (i.e. substantially perpendicular to the plane of the work deck) or show an angle with respect to the plane of the work deck. The latter position is also the position in which the rotor will finally be attached to the nacelle of a wind turbine.

According to another aspect of the invention, an assembly of an offshore platform and a device for assembling a wind turbine at sea as described above is provided, whereby the device is connected to the offshore platform.

A jack-up offshore platform and/or the transport vessel for transporting the wind turbine components in unassembled state typically comprise a work deck, which can take substantial loads, and a number of anchoring piles positioned at the corners of the work deck and supporting it. Each anchoring pile extends substantially vertical and is translatable in this direction from a high position during transport to a low position in the anchored state, in which state the piles find support on the sea floor. The height of the work deck with respect to the water level can be modified by moving the work deck relative to the piles by means of hydraulic cylinders for instance. The work deck can be jacked in the anchored state to above the water level. It is however also possible to only stabilise the platform, by jacking the platform only partially to a level where the piles find support on the sea floor yet the work deck still makes partial contact with the water. A platform stabilised this way can be made lighter because a part of the load is carried by the water.

The connection of the device to the jack up platform is preferably such that the rotating means of the support structure may be positioned outside the periphery of the platform. This allows to manipulate a (partly) assembled rotor outside the periphery of the platform, which usefully limits the requirements with respect to dimensions, weight, etc. of the platform. The most straightforward way of achieving this is according to a preferred embodiment, wherein the device is connected to one side edge of the platform, and more preferably to a side edge of the platform that is not a side facing the foundation of a wind turbine to be build. A side edge of the platform also comprises a corner edge thereof (i.e. where two side edges join).

In yet another aspect of the invention, a method for assembling a wind turbine at sea is provided, the method comprising assembling a rotor of a wind turbine at sea as elucidated above, and the step of attaching a hub with a plurality of blades connected thereto (together defining a rotor in assembled state) to the mast of a wind turbine. The rotor in assembled state may be manipulated by a lifting crane present on the work deck of the jack up platform, if desired with the aid of a tailing crane.

The device and assembly according to the invention allow to manipulate a rotor of any size in (partly) assembled state easily and efficiently, without affecting or hindering the operations on the jack-up platform. The device and assembly in particular are useful to assemble wind turbines of relatively large sizes, preferably 40 m and higher, more preferably 70 m and higher, and even more preferably 100 m and higher.

BRIEF DESCRIPTION OF THE DRAWINGS

The invention will now be explained in more detail with reference to the accompanying figures, without however being limited thereto. In the figures.

DETAILED DESCRIPTION

Figure 1:
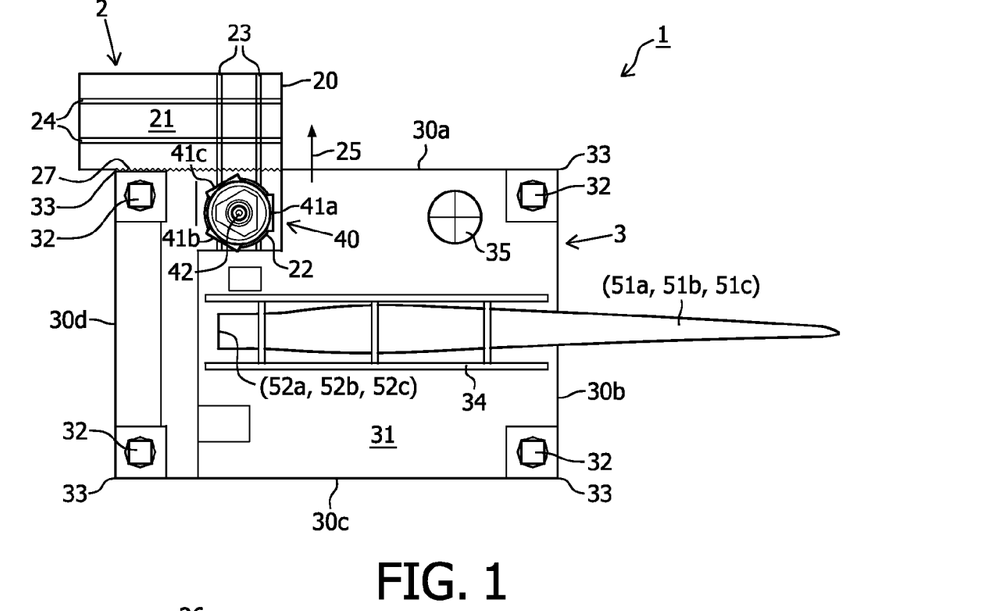
FIG. 1 is a schematic top view of an embodiment of an assembly of the device and platform according to the invention in a starting position.
Figure 8:
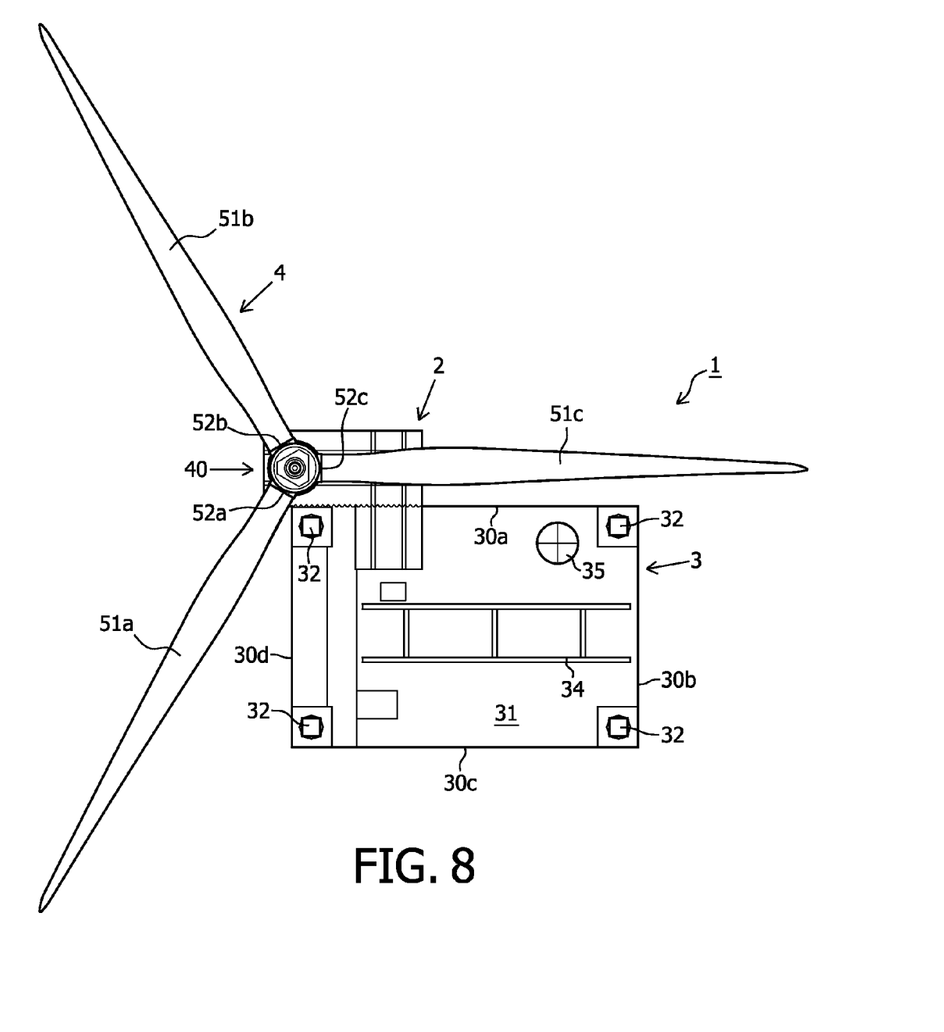
FIG. 8 is a schematic top view of the embodiment of FIG. 1 after a seventh step of the method according to the invention.
Figure 9:
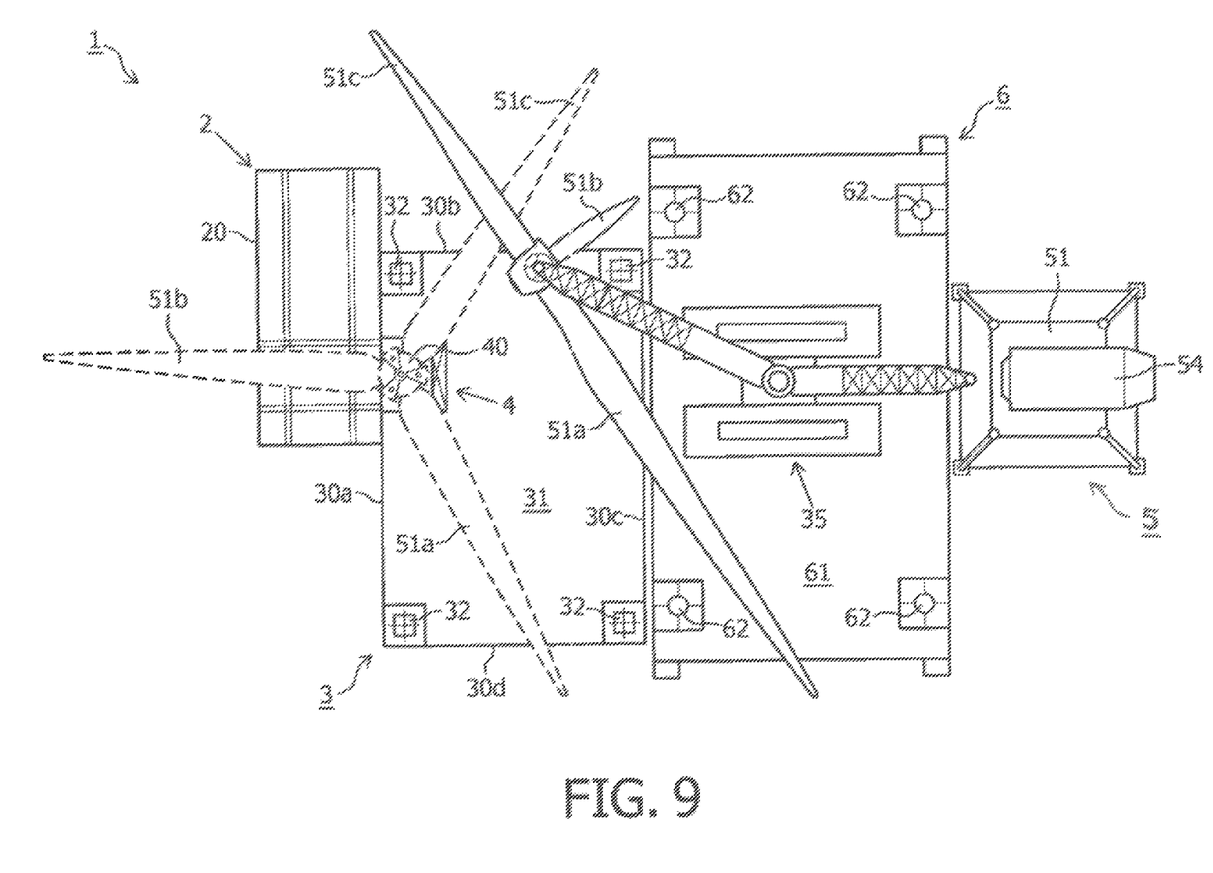
FIG. 9 is a schematic top view of an assembly of a device and platform according to another embodiment of the invention, and a (partly) assembled wind turbine.

With reference to FIG. 1, an embodiment according to the invention of an assembly 1 comprising a device 2 and an offshore platform 3 is shown. Assembly 1 is adapted for assembling a rotor 4 of a wind turbine 5 at sea (see also FIG. 9). The rotor 4 comprises a hub 40 in the form of a substantially cylindrical body onto which are defined three attachment flanges (41a, 41b, 41c) for blades. Attachment flanges (41a, 41b, 41c) are regularly spaced in the circumferential direction of the hub 40, such that the circumferential angle between any two of the attachment flanges (41a, 41b, 41c) is about 120 degrees. To each of the attachment flanges (41a, 41b, 41c) a wind turbine blade (51a, 51b, 51c) may be attached to form a rotor 4 in assembled state (FIGS. 8 and 9).

In the assembled state, the blades (51a, 51b, 51c) extend outwardly and about perpendicular to the longitudinal axis 42 of hub 40.

Device 2 comprises a support structure 20 in the form of a work deck 21, supported by a plurality of stiffening beams that extend underneath the work deck 21, and are therefore not visible in the figures. Although preferred for easy accessibility, work deck 21 need not be present and any (open) structural framework that is structurally stiff and strong enough to carry a fully assembled rotor 4 will be sufficient for this purpose. Support structure 20 is further provided with means for rotating the hub 40 around the hubs longitudinal axis 42, the means comprising a disc-shaped turntable 22 that is provided with a number of clamps (not shown) to grip and hold hub 40. The clamps ensure that hub 40 will rotate together with turntable 22. Turntable 22 may be rotated in any direction and its position may be fixated for any rotating angle. Support structure 2 is connected to the offshore platform 3 such that the turntable 22 may be positioned outside the periphery (30a, 30b, 30c, 30d) of platform 3, as will be explained further below. The periphery of platform 3 is formed by the side edges (30a, 30b, 30c, 30d) of its work deck 31. The device 2 is connected to one side edge 30a of platform 3 by any means known in the art, such as by weld connection 27. It is also possible to provide a temporary connection to platform 3, such as the one formed by a plurality of hooks, attached to the support structure 20, which hooks catch a rim provided on the edge 30a of platform 3. As shown in FIG. 9, a preferred side edge 30a for connecting the support structure 20 to platform 3 is not a side 30c facing the foundation 51 of a wind turbine to be build, but preferably is a side edge 30a opposite such side edge 30c.

Figure 3:
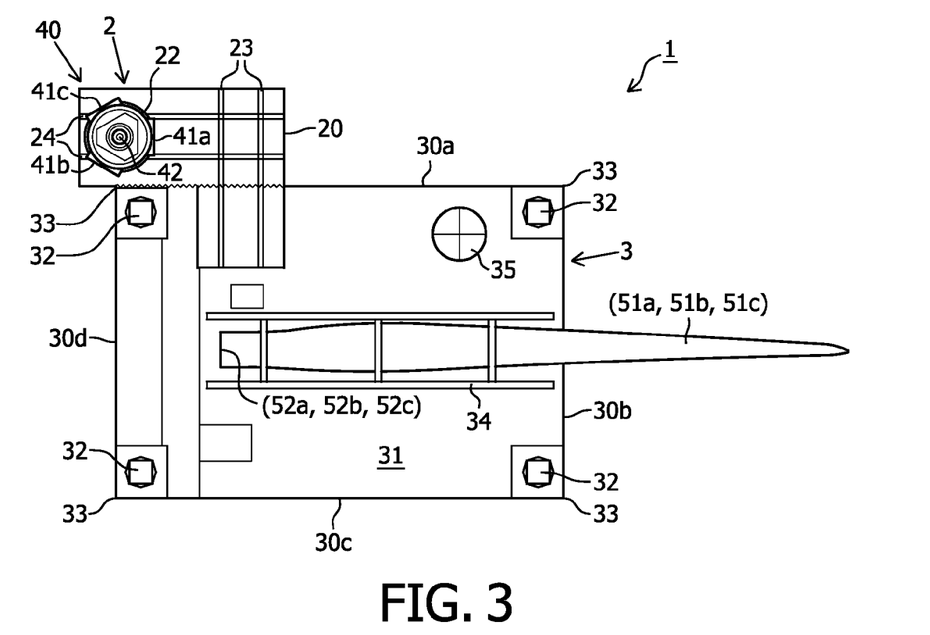
FIG. 3 is a schematic top view of the embodiment of FIG. 1 after a second step of the method according to the invention.
Figure 4:
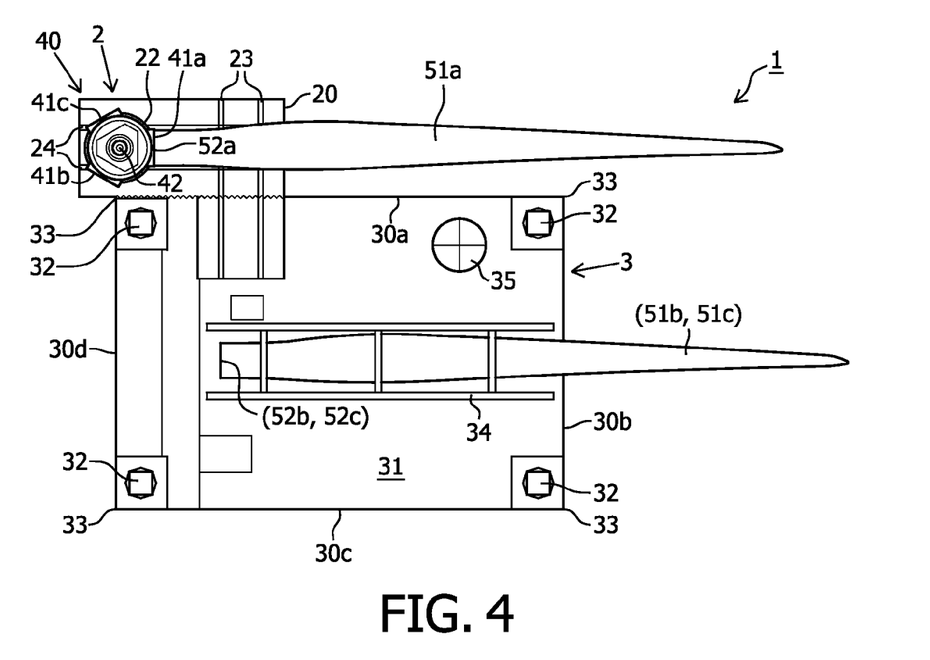
FIG. 4 is a schematic top view of the embodiment of FIG. 1 after a third step of the method according to the invention.

Connecting the device 2 to the jack up platform 3 such that the turntable 22 is or may be positioned outside the periphery (30a, 30b, 30c, 30d) of platform 3 allows to manipulate a (partly) assembled rotor 4 outside this periphery, which usefully limits the space requirements of platform 3. An embodiment in which the turntable 22 is positioned outside the periphery (30a, 30b, 30c, 30d) of platform 3 is one in which turntable 22 is permanently located outside this periphery (30a, 30b, 30c, 30d), such as shown in FIG. 3 for instance. It is more advantageous to be able to bring the turntable 22 to positions that are both inside or outside the periphery (30a, 30b, 30c, 30d) of platform 3.

Such an embodiment is shown in FIG. 1 for instance. The embodiment of the support structure 2 shown in FIG. 1 further comprises means that are adapted to translate the hub 40 with respect to support structure 2 and platform 3. These means comprise a number of sliding rails (23, 24) of which pair 23 runs in the direction perpendicular to the side edge 30a to which support structure 20 is attached to platform 3, whereas pair 24 runs about parallel to this side edge 30a. The turntable 22 is to its underside provided with a number of wheels (not shown) that cooperate with sliding rails (23, 24) to translate the turntable 22 with respect to the platform 3 in the indicated directions 25 and 26, parallel to side edges (30b, 30d) and (30a, 30c) of platform 3 respectively. It should be noted that any other suitable translation means is equally possible, such as magnetic means and the like. By providing sliding rails (23, 24), the turntable 22 (and therefore also a hub 40 attached to it) may be brought inside and out of the periphery (30a, 30b, 30c, 30d) of platform 3.

Turntable 22 preferably is supported by a hydraulic cylinder that is able to bring turntable 22 to different adjustable heights. This allows to adjust the height of the hub 40 or the height of the blades (51a, 51b, 51c) attached to the hub 40 relative to the level of the platform work deck 31. This helps to easily access the blades (51a, 51b, 51c) or the hub 40 from the work deck 31. It may also be used to bring the hub 40 and/or the blades to a level that is substantially higher than the level of work deck 31, for temporary storage, for inspection, or for any other desirable purpose, such as allowing a faster and more expedient assemblage of a wind turbine.

Jack-up offshore platform 3 that may also be used for transporting the wind turbine components (40, 51a, 51b, 51c) in unassembled state typically comprises a work deck 31, which can take substantial loads, and a number of anchoring piles 32, positioned at the corners 33 of the work deck 31 and supporting it. Each anchoring pile 32 extends substantially vertical and is translatable in this direction from a high position during transport to a low position in the anchored state, in which state the piles 32 find support on the sea floor. The height of the work deck 31 with respect to the water level can be modified by moving the work deck 31 relative to the piles 32 by means of hydraulic cylinders for instance. The work deck 31 may be jacked in the anchored state to above the water level. Work deck 31 is further provided with a stacking frame 34 onto which floors a plurality of wind turbine blades (51a, 51b, 51c) may be stacked for transport and storage. A hub 40 is attached to turntable 22, which for transport is preferably fixated in a static position. Work deck 31 is typically also provided with a lifting crane 35, which is used for manipulating the components (40, 51a, 51b, 51c) separately or the rotor 4 in (partly) assembled state.

With reference to FIGS. 1-8, different steps of an embodiment of the method according to the invention are shown. A platform 3, provided with device 1 is loaded with wind turbine components onshore, such as rotor blades (51a, 51b, 51c) that are loaded in stacking frame 34, and a hub 40 that is secured to the support structure 2 by gripping means. Another possibility is to load the platform 3 with a partly assembled rotor, for instance a rotor consisting of a hub 40 to which have been attached two blades (51a, 51b) only. Such a partly assembled rotor is still relatively easy transportable since it may be stored in a plane, and therefore does not catch as much wind as a fully assembled rotor. After having loaded the platform 3 with all components necessary for assembling a rotor of a wind turbine at sea, the platform 3 is sailed to in the vicinity of a foundation 51 of a wind turbine to be build at sea. The platform 3 is then anchored close to the foundation 51 by lowering the spud poles 32 until they take support onto the sea bottom, and with the side edge 30a that carries the support structure 2 facing away from foundation 51. It may be possible to use an intermediate platform 6, as shown in FIG. 9, between foundation 51 and platform 3, if this is required to save space or because of the large dimensions of the blades (51a, 51b, 51c) for instance.

In a first step (FIG. 1), the hub 40 is attached to the turntable 22 of support structure 2 whereby turntable 22 is within the periphery (30a, 30b, 30c, 30d) of platform 3 for easy access. The blades (51a, 51b, 51c, 51d) are in this first step stored in stacking frame 34, one above the other. Hub 40 is positioned in an upstanding position with its longitudinal axis 42 substantially coinciding with the vertical direction, i.e. the direction perpendicular to the plane of the work deck 31 of platform 3.

Figure 2:
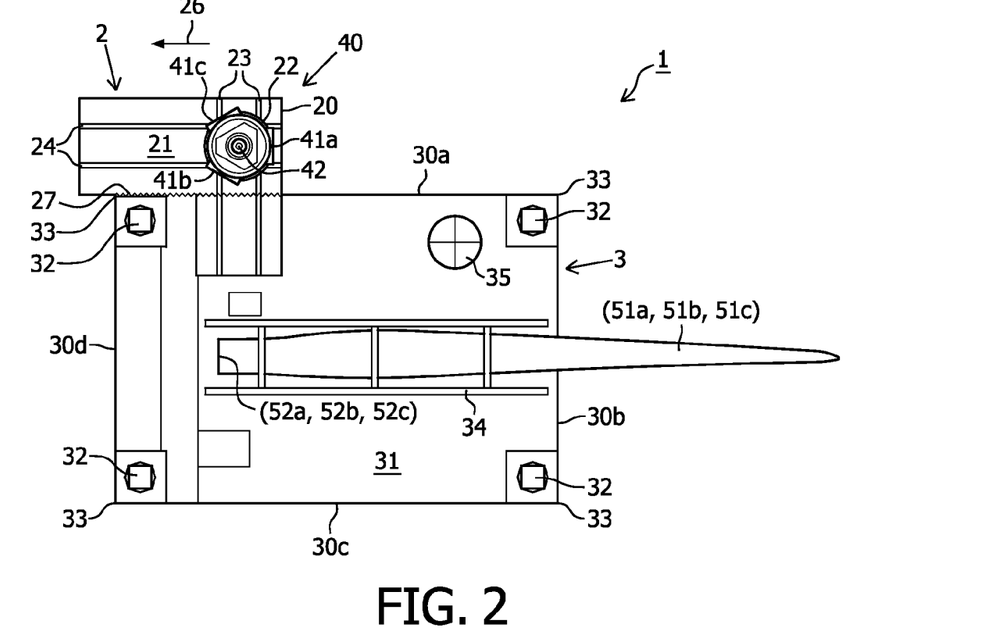
FIG. 2 is a schematic top view of the embodiment of FIG. 1 after a first step of a method according to the invention.

In a second step of the method, the hub 40 is brought outside the periphery (30a, 30b, 30c, 30d) of platform 3 by translating the turntable 22 along sliding rails 23 in the direction 25 to obtain the position shown in FIG. 2, and then translating the turntable 22 along sliding rails 24 in the direction 26 to obtain the first position as shown in FIG. 3. In the first position of the hub 40, one of the flanges (41a, 41b, 41c) for attaching a blade is oriented such that a blade attached thereto substantially extends parallel to the side 30a of platform 3, i.e. in the direction 26. In the example shown this is flange 41a.

In a third step of the method (FIG. 4), blade 51a that is stored on top of the other blades (51b, 51c) in stacking frame 34 is taken up by lifting crane 35 and transported such that the proximal end 52a of blade 51a abuts against flange 41a. In this process, blade 51a is guided by personnel present on platform 3. Manipulating blade 51a is relatively easy since this blade 51a extends substantially parallel and relatively close to the side 30a of platform 3. The proximal end 52a is then connected to flange 41a by means known in the art, such as by bolting.

Figure 5:
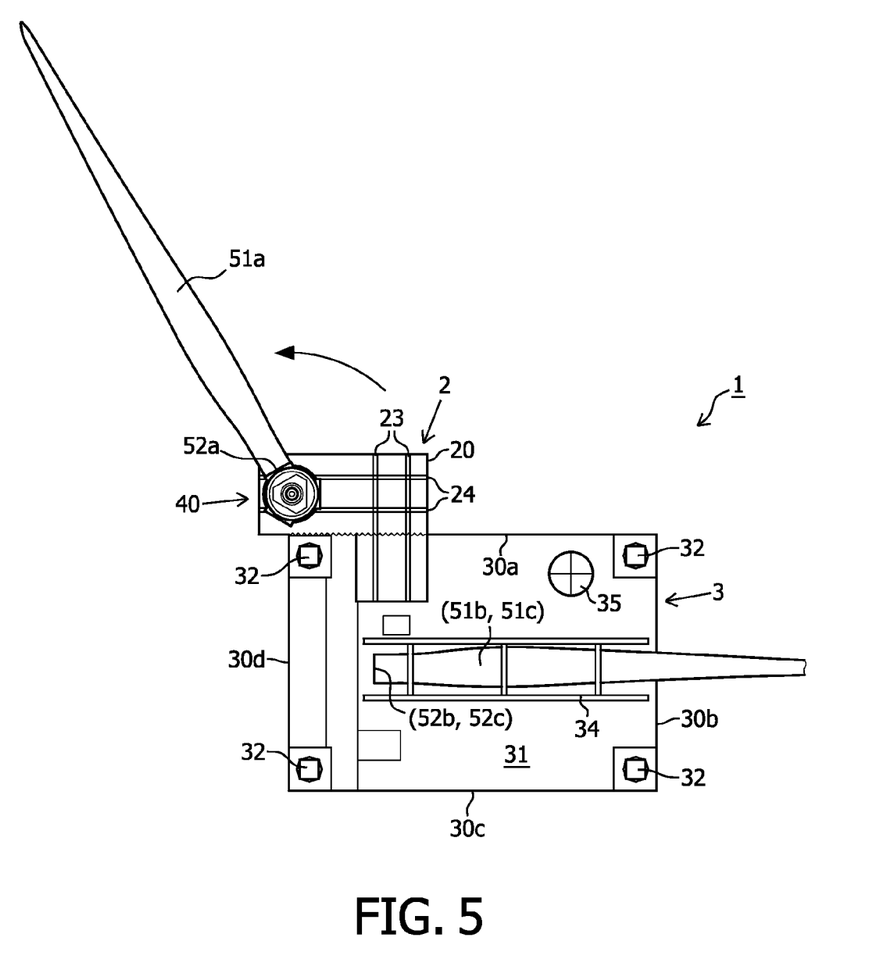
FIG. 5 is a schematic top view of the embodiment of FIG. 1 after a fourth step of the method according to the invention.
Figure 6:
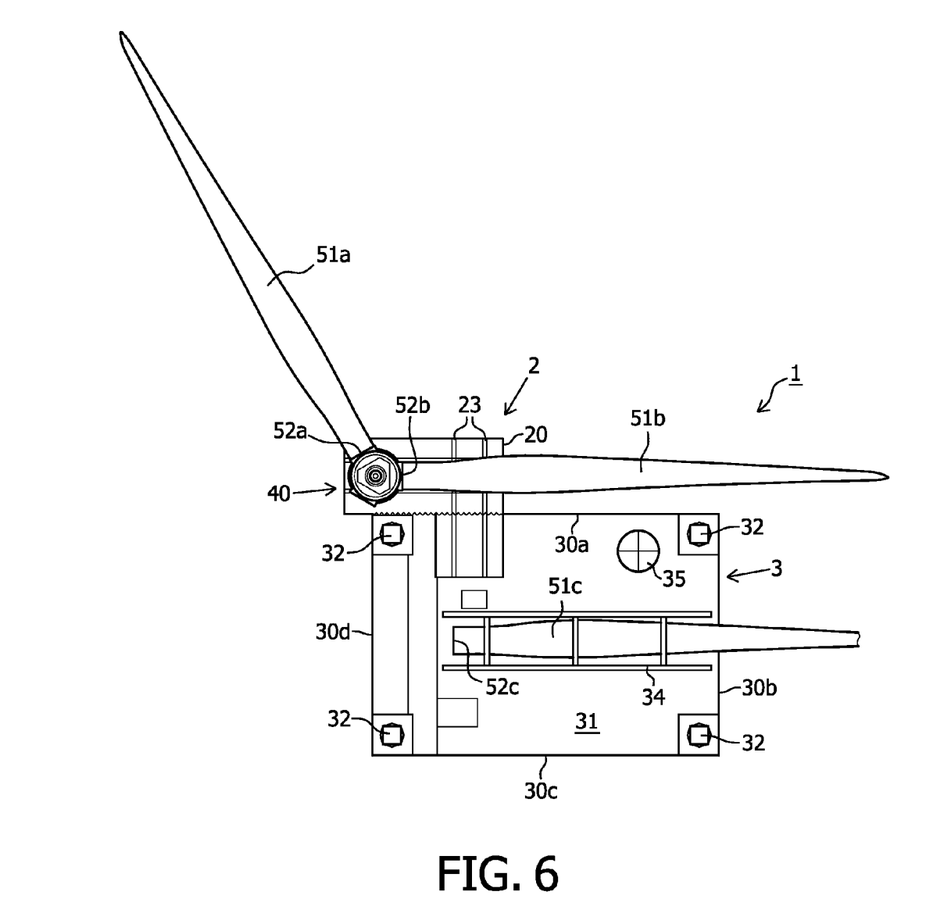
FIG. 6 is a schematic top view of the embodiment of FIG. 1 after a fifth step of the method according to the invention.

Starting from said first position, the hub 40 is then rotated around the hubs longitudinal axis 42 to a second position, as shown in FIG. 5. This second position is reached in a fourth step by rotating the turntable 22 over an angle of about 120 degrees in the counter clockwise direction. In the second position also, one of the flanges (41a, 41b, 41c) for attaching a blade is oriented such that a blade attached thereto substantially extends parallel to the side 30a of platform 3, i.e. in the direction 26. In the example shown this is flange 41b. Blade 51a that has already been attached to hub 40 in the first position rotates in a substantially horizontal plane when rotating hub 40 to the second position. Since hub 40 is rotated in a counter clockwise direction, the blade 51a connected to hub 40 is rotated away from platform 3. This prevents that connected blade 51a traverses part of the work deck 31 of platform 3.

In a fifth step of the method (FIG. 6), blade 51b that is stored on top of the other remaining blade 51c in stacking frame 34 is taken up by lifting crane 35 and transported such that the proximal end 52b of blade 51b abuts against flange 41b. This process is carried out as described above for blade 51a. The proximal end 52b is then connected to flange 41b by means known in the art, such as by bolting.

Figure 7:
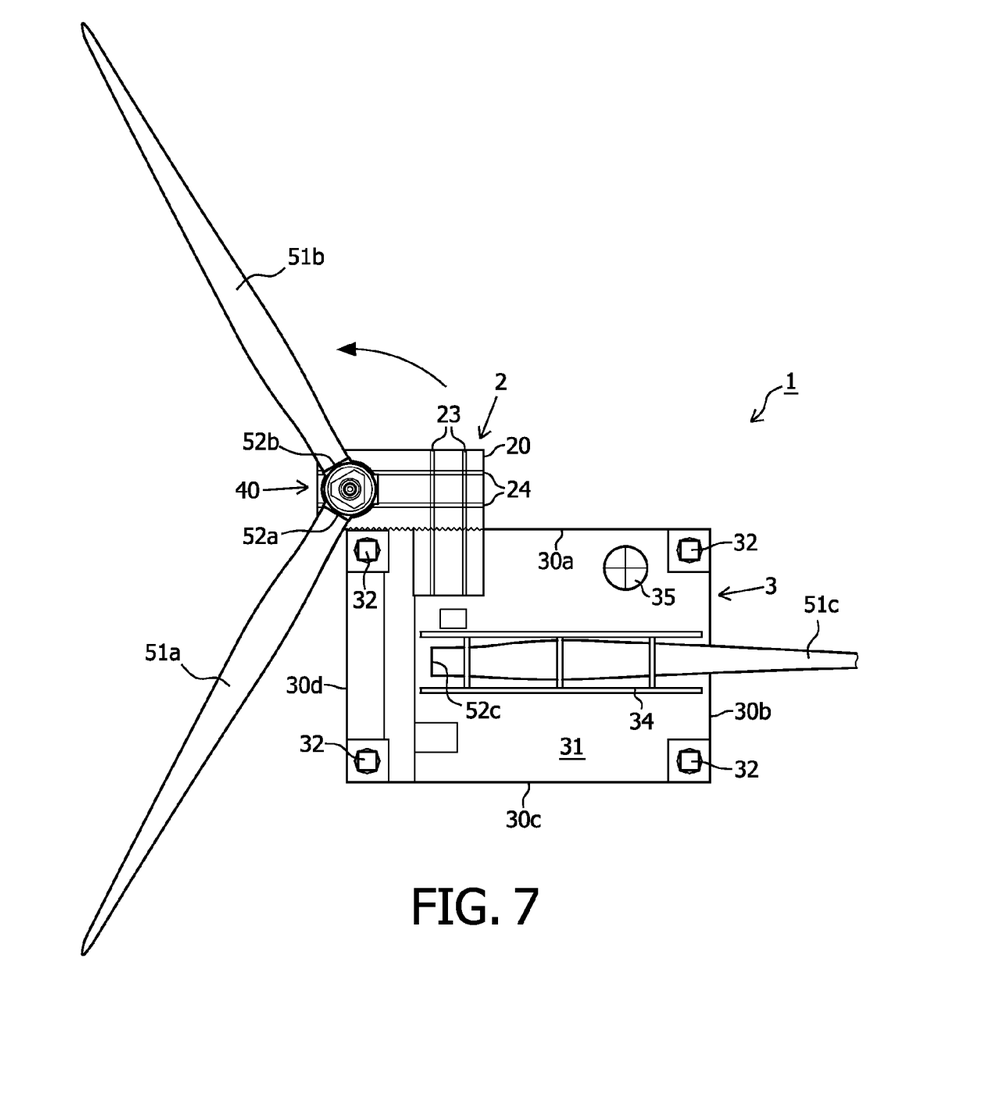
FIG. 7 is a schematic top view of the embodiment of FIG. 1 after a sixth step of the method according to the invention.

Starting from said second position, the hub 40 is then rotated again around the hubs longitudinal axis 42 to a third position, as shown in FIG. 7. This third position is reached in a sixth step by again rotating the turntable 22 over an angle of about 120 degrees in the counter clockwise direction. In the third position also, one of the flanges (41a, 41b, 41c) for attaching a blade is oriented such that a blade attached thereto substantially extends parallel to the side 30a of platform 3, i.e. in the direction 26. In the example shown this is now flange 41c.

In a seventh step of the method (FIG. 8), the only remaining blade 51c in stacking frame 34 is taken up by lifting crane 35 and transported such that the proximal end 52c of blade 51c abuts against flange 41c. This process is carried out as described above for blades 51a and 51b. The proximal end 52c is then connected to flange 41c by means known in the art, such as by bolting. In this third position a substantially fully assembled rotor is obtained, comprising a hub 40 to which a plurality of blades (51a, 51b, 51c) have been attached.

FIG. 9 finally shows the step of attaching a hub 40 with a plurality of blades (51a, 51b, 51c) connected thereto (together defining a rotor 4 in assembled state) to the mast of a wind turbine 5. The rotor 4 in assembled state is manipulated by lifting crane 35 present on the work deck 31 of jack up platform 3, or, as shown, on the work deck 61 of an intermediate platform 6, that has been anchored close to foundation 51 by lowering its spud poles 62. Rotor 4 is taken up from its position on the turntable 22 of support structure 2 (shown in dotted line in FIG. 9) to reach a position (shown in full line in FIG. 9), wherein the blades (51a, 51b, 51c) extend in a substantially vertical direction. Crane 35 then turns towards the foundation 51 such that hub 40 abuts against the nacelle 54 of wind turbine 5, to which the hub 40 is then connected by means known in the art, such as by bolting.

The invention is not limited to the embodiments shown in the figures and many variants may be envisaged within the scope of the attached claims.

The invention claimed is:

1. Device for assembling a rotor of a wind turbine at sea, whereby the rotor components comprise a hub and a number of blades attached to the hub in the assembled state, the device comprising
   a support structure that provides a work deck, supported by a plurality of stiffening beams extending underneath it, for supporting the rotor of the wind turbine,
   wherein the support structure is provided with means for rotating the hub of the rotor in unassembled state around the hub's longitudinal axis, and around a substantially vertical axis from a first position, in which a blade may be connected to the hub, to a second position, in which a second blade may be connected to the hub,
   wherein the support structure is further adapted to be connected to an offshore platform such that the rotating means may be positioned outside the periphery of the platform.

2. Device according to claim 1, wherein the rotating means comprise a turntable, provided with gripping means for the hub.

3. Device according to claim 1, wherein the support structure and rotating means are adapted to translate the hub with respect to the support structure from a position within the periphery of the platform to a position outside the periphery of the platform.

4. Device according to claim 1, wherein the rotating means are adjustable in height.

5. Device according to claim 1, wherein the support structure and rotating means are adapted to translate or tilt the hub with respect to the support structure.

6. Device according to claim 5, wherein at least a part of the support structure is adapted to tilt around a horizontal axis for bringing an at least partly assembled rotor from a position in which the blades are substantially parallel to the plane of the work deck to a position in which the rotor blades are substantially perpendicular to the plane of the work deck or show an angle with respect to the plane of the work deck.

7. Assembly of an offshore platform and, connected thereto, a device according to claim 1.

8. Assembly according to claim 7, wherein the device is connected to the platform such that the rotating means of the support structure may be positioned outside the periphery of the platform.

9. Assembly according to claim 8, wherein the device is connected to one side edge of the platform.

10. Method for assembling a rotor of a wind turbine at sea, the method comprising providing an assembly according to claim 8, providing a plurality of blades and a hub that together define a rotor in unassembled state, attaching the hub to the rotating means of the support structure to obtain a first position of the hub, connecting a blade to the hub in said first position, rotating the hub around the hub's longitudinal axis and around a substantially vertical axis to a second position, and connecting a second blade to the hub in said second position.

11. Method according to claim 10, wherein the sequence of rotating the hub from the first to the second position and connecting the blade to the hub in said second position is repeated until all blades have been connected to the hub, and the hub is released from the rotating means.

12. Method according to claim 11, wherein the height of the hub, or the height of blades attached to the hub, relative to the level of the platform work deck is adjusted.

13. Method according to claim 11, wherein the hub is rotated such that the blade connected to the hub is rotated away from the platform.

14. Method for assembling a wind turbine at sea, the method comprising a method according to claim 11, and the step of attaching the hub with the plurality of blades connected thereto (together defining the rotor in the assembled state) to a mast of the wind turbine.

* * * * *